Patented Mar. 27, 1923.

1,449,905

UNITED STATES PATENT OFFICE.

WILLIAM HENRY LOVETT AND ALBERT EDWIN DOBBS, OF WALTON-ON-THE-NAZE, ENGLAND.

BOILER FEED-WATER REGULATOR.

Application filed May 11, 1922. Serial No. 560,244.

*To all whom it may concern:*

Be it known that we, WILLIAM HENRY LOVETT and ALBERT EDWIN DOBBS, subjects of the King of Great Britain and Ireland, residing, respectively, at Sandycot, Walton-on-the-Naze, Essex, England, and 2 Portobello Road, Walton-on-the-Naze, Essex, England, have invented certain new and useful Improvements Relating to Boiler Feed-Water Regulators, of which the following is a specification.

This invention relates to boiler feed-water regulators of the type in which a float operated valve is employed to control the movement of a balance piston which in turn controls the boiler feed check valve.

The invention has among its objects to provide an apparatus simple in construction and effective in operation and to provide a construction wherein the float operated valve is balanced laterally and longitudinally.

The invention is illustrated by way of example in the accompanying drawings in which Figure 1 is a sectional elevation of a feed-water regulator according to the invention.

Figure 1:
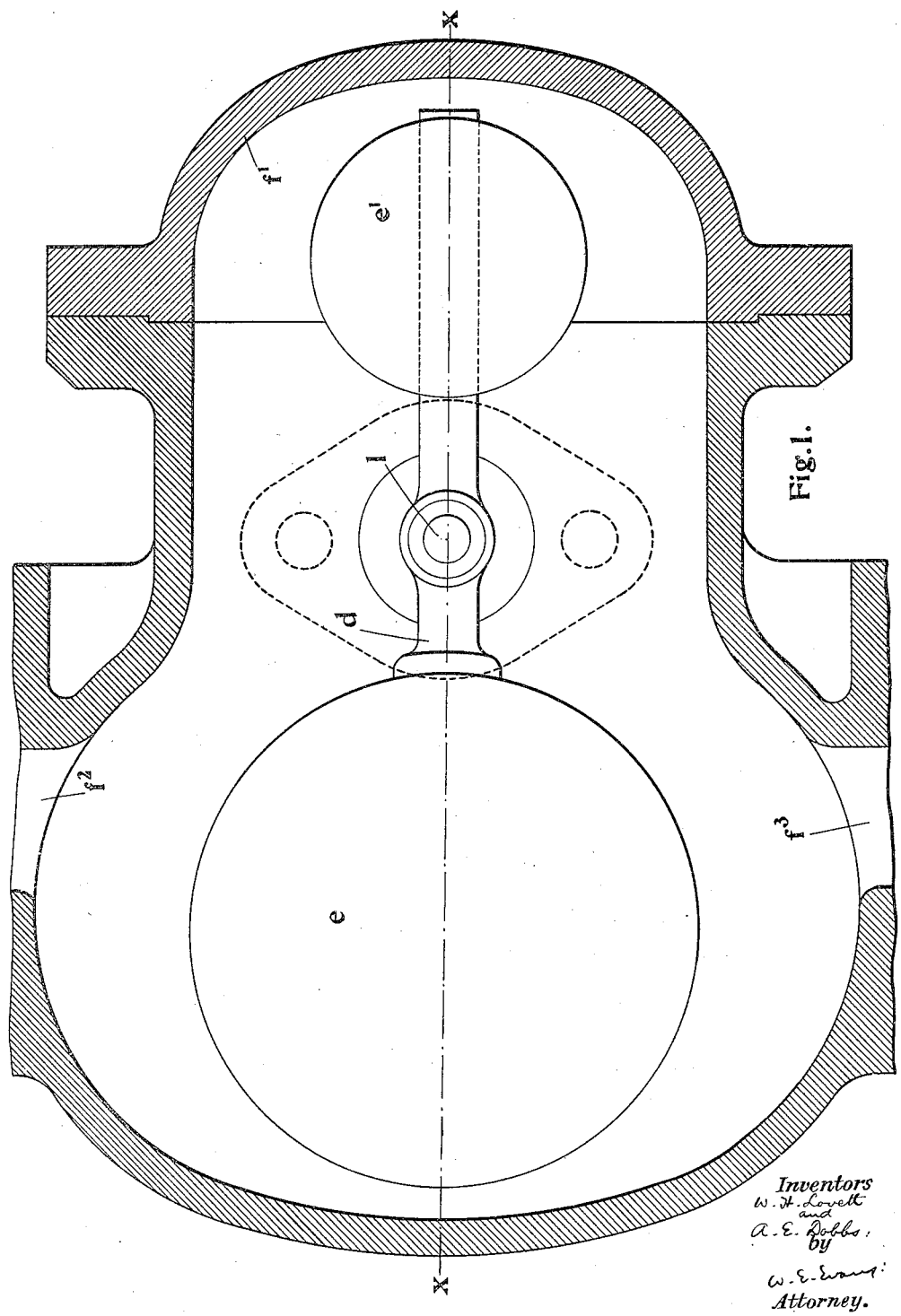
Figure 2:
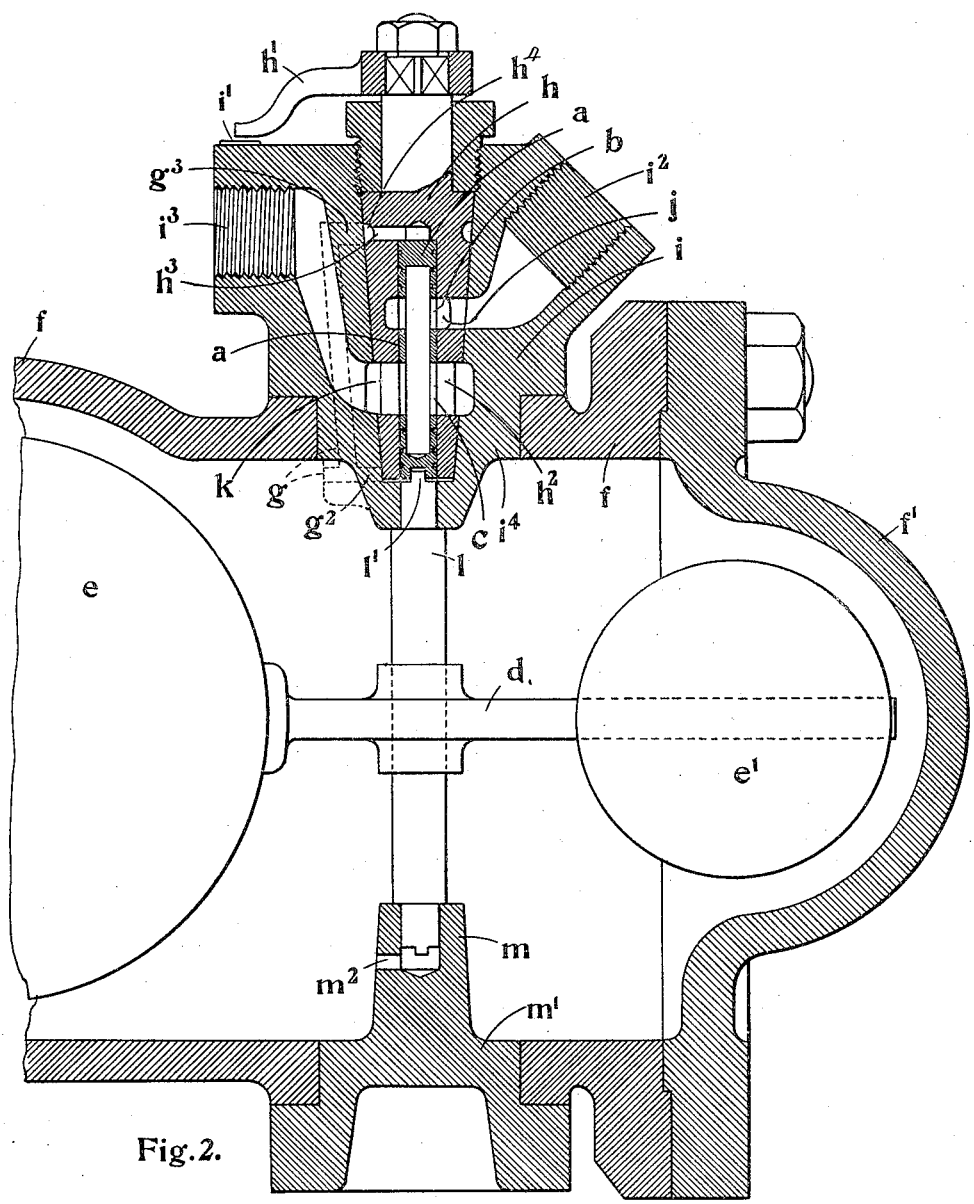
Figure 2 is a corresponding sectional plan
Figure 5:
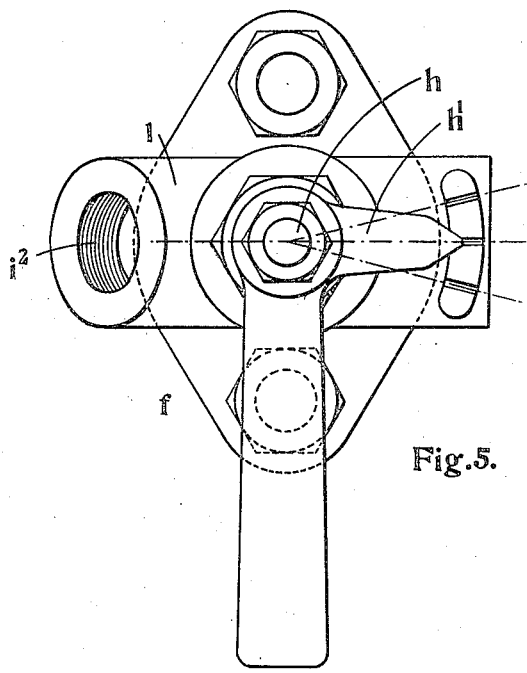
Figure 3:
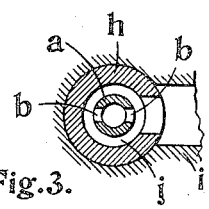
Figure 3 is a detail section through the inlet port of the valve
Figure 4:
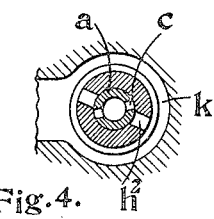

Figure 4 a corresponding detail section through the outlet port of the valve as the valve is cutting off and Figure 5 is a detail front elevation of the indicator.

According to the invention the float operated valve $a$ is provided as a hollow cylindrical member with inlet and outlet ports $b$ and $c$ and so arranged that on partial rotation the valve is opened or closed to permit, on the opening of the valve, of the passage therethrough of fluid, this movement being effected under the operation of a rocking float lever $d$ or equivalent means actuated by the partly immersed float $e$ contained in a casing $f$ wherein a level $x-x$ of liquid is maintained corresponding to that in the boiler.

According to the invention moreover the inlet and outlet ports $b$ and $c$ of the hollow cylindrical valve $a$ are formed radially with reference to its longitudinal axis, the inlet and outlet ports being in communication with the central longitudinal bore or cavity $a^1$ and the respective ends of the hollow cylindrical valve are closed. The respective ports $b$ and $c$ are advantageously formed in pairs of the same area on both sides and are disposed in diametrically opposite positions whereby lateral balance is thus assured.

According to the invention moreover the closed ends of the hollow cylindrical valve are placed in communication with each other by means of a duct $g$ which is also in communication with the interior of the float casing $f$ whereby longitudinal balance is thus assured.

According to the invention moreover the hollow cylindrical valve $a$ may be set within a cylindrical cavity provided centrally within a carrying plug $h$ which is advantageously of a conical form and by which it may be mounted within a conical or other recess adapted for its reception within a fitting or housing $i$ secured to one side of the float casing $f$, which fitting or housing is provided with pipe connections and corresponding ports leading to annular ports or passages $j$ $k$ respectively provided in the conical plug $h$, and which ports or passages correspond in position to the respective pairs of inlet and outlet ports $b$ and $c$ provided in the hollow cylindrical valve.

The parts of the conical plug $h$ by which the hollow cylindrical valve $a$ is carried are provided with fluid tight joints in positions between and beyond the annular passages or ports $j$ $k$ and the hollow cylindrical valve $a$ is also provided to make a fluid tight joint in positions between the respective pairs of inlet and outlet ports $b$ and $c$. For this purpose annular grooves may be provided around the hollow cylindrical valve in positions between the respective pairs of inlet and outlet ports.

According to the invention the plug $h$ by which the hollow cylindrical valve $a$ is carried is capable of partial rotation so as thus to vary the angular position of the respective pairs of outlet ports $c$ and thus to vary the operative level of liquid within the float casing, and for this purpose the outwardly extending part of the plug $h$ may have mounted upon it a hand lever and an index finger $h^1$, the latter being disposed against a scale of graduations $i^1$ showing for example "high", "normal" and "low" levels and the plug may be secured in position by means of a screwed nut or gland which at the same time may serve as a means for withdrawing the plug from its seat within the fitting or housing.

It will be understood that the action of turning the plug $h$ either way alters the angle of valve cut off thereby causing the valve $a$ to close with the float $e$ in a correspondingly higher or lower position, the level of water within the float casing $f$ being raised or lowered accordingly. It will furthermore be understood that the movement of the plug $h$ for the variation of the operative water level does not interfere with the registering of the inlet and outlet ports $b$ and $c$ or with communication between balancing duct $g$ formed within the fitting and in the plug, the plug or housing being provided either with an annular groove or an enlargement to ensure constant communication in any position in which the carrying plug $h$ is set.

According to the invention the pair of inlet ports $b$ in the hollow cylindrical valve $a$ are surrounded by an annular recess $j$ in the carrying plug, which latter leads through a lateral port in the plug to a lateral passage in the fitting or housing, which latter leads to a screw threaded hole $i^2$ through which the steam inlet pipe is secured.

According to the invention a pair of outlet ports $h^2$ are provided in diametrically opposite positions in the conical plug $h$ at a position corresponding to the pair of outlet ports $c$ in the hollow cylindrical valve $a$ and the outlet ports $c$ in the valve are of equal area to ensure balance of the valve, the arrangement being such that on the rotation of the hollow cylindrical valve $a$, so that the outlet ports $c$ in the hollow cylindrical valve come into alignment with the outlet ports $h^2$ in the plug, fluid passes through, while on the outlet ports $c$ in the hollow cylindrical valve moving out of alignment, the valve being closed, the passage of fluid through the valve is interrupted.

It will be understood that the annular recess $k$ may be provided partly in the conical plug h and partly within the fitting or housing $i$ in exactly opposite positions, into which the fluid may discharge from the outlet ports $h^2$ in the conical plug, the fluid passing from the annular recess through a lateral port in the fitting or housing, leading to a screw threaded hole $i^3$ in which the outlet pipe is advantageously secured in position on the fitting or housing opposite to that at which the inlet pipe is secured.

According to the invention the fitting or housing $i$ is adapted at one end to fit within a hole formed for its reception at one side of the float casing $f$ and to protrude inwardly to form a boss $i^4$ within which terminates the conical recess in the fitting or housing, the boss $i^4$ being provided moreover with a hole concentric therewith and concentric also with the hollow cylindrical valve $a$, and the carrying plug $h$ is thus adapted for the reception of the end of a spindle $l$ on which the oscillating float lever $d$ is mounted, the oscillating spindle $l$ having thus its axis concentrically disposed with that of the hollow cylindrical valve $a$ and carry-plug $h$; and means are provided by which the partial rotation of the float spindle $l$ may be communicated to the cylindrical valve $a$. Such means may for example consist of a diametric recess in the adjacent end of the hollow cylindrical valve and a corresponding diametric ridge or flange $l^1$ on the adjacent end of the float spindle $l$.

The end of the float spindle $l$ opposite to that at which it is connected in the manner described to the end of the hollow cylindrical valve $a$, may be carried within an inwardly protruding boss $m$ provided upon a small cover or plug $m^1$ adapted to fit within a hole concentrically and oppositely disposed on the other side of the float casing to that through which one end of the valve fitting or housing $i$ is mounted as hereinbefore described, and the float spindle $l$ may be balanced longitudinally by putting the space provided at the inwardly protruding end of the fitting or housing, and in the boss of the small cover or plug as aforesaid, in communication with the interior of the float chamber by means of radial holes $g^2$ $m^2$.

The radial hole $g^3$ provided in the inwardly protruding part of the valve housing communicates through a duct with the inner face of the conical seat in the housing at a position corresponding to the outer end of the hollow cylindrical valve $a$ where an annular groove $h^4$ is formed upon the exterior of the valve carrying plug and a radial hole $h^3$ being provided for communication between the annular groove aforesaid and a centrally disposed space formed in the plug adjacent the outer end of the hollow cylindrical valve $a$ so that thus both ends of the hollow cylindrical valve $a$ are in communication with the interior of the float casing $f$ as well as both ends of the float-spindle $l$.

According to the invention moreover the float casing $f$ is constructed of such a symmetrical form that either side of the casing is adapted for the reception of the valve housing $i$ constructed as hereinbefore described. At one end of the casing, however, in a plane parallel with the axis of the float spindle $l$, the float casing is adapted for the reception of a cover $f^1$ which may be applied in position with a spigotted joint so as thus to withstand the high pressure and temperature, and this cover may be of a circular form corresponding to the circular sectional form of the main part of the casing $f$, and its central part may be of an outwardly protruding curved or semispherical shape adapted to accommodate the end of the float lever $d$. By such a construction the size of the float casing $f$ is reduced to a minimum, the hole formed in the main part of the float casing being large enough for the passage therethrough of the float $e$. Or the valve housing $i$ may be attached to the cover instead of being on the main part of the float casing.

It will be understood that the upper part of the casing and the lower part in an opposite position, and in positions parallel with the axis of the float spindle and valve, are formed with faces at $f^2$ and $f^3$ for the respective steam and water connections with the boiler, and that part of the casing in position between is advantageously enlarged to accommodate the float $e$ and to permit of its oscillatory movement upon its spindle $l$. It will furthermore be understood that the float will be immersed within the water or fluid in the float chamber and that any rise or fall of the level will destroy the balance and cause the float lever $d$ to partially rotate or oscillate its spindle and thus cause corresponding rotation of the hollow cylindrical valve $a$.

The float $e$ may be hollow and it may be of any suitable metal or material, and the opposite end of the float lever may have mounted upon it a weight $e^1$.

It will furthermore be understood that by such a construction, only a small amount of friction is involved in the operation of the valve and that the movement of the valve is sensitive to variations in the water level. Moreover the valve and oscillating spindle being completely balanced, the water level remains unchanged at all pressures. Furthermore it will be understood that the handle provided for adjusting the valve carrying plug within the housing to vary the operative water level may also be used for testing the freedom of the float gear and valve.

It will be understood that the invention comprises in part the various features of construction and operation as herein described, but that it is not confined to the constructional features specified. For example the hollow cylindrical valve may be otherwise formed than hereinbefore described and the valve cut off may be effected through the inlet ports instead of through the outlet ports or through both the inlet and outlet ports. Or again instead of mounting the hollow cylindrical valve within a plug or carrier in the manner described, it may be directly mounted within the housing, or yet again it may be mounted within a carrier of a different form from the carrying plug as hereinbefore described. Or again the hollow cylindrical valve may be formed integrally with the oscillating spindle or with part of the oscillating spindle and the movement of the float lever may be communicated to the valve otherwise than hereinbefore described. Furthermore instead of the valve being of a hollow cylindrical form, it may be of any other form adapted to be rotated, oscillated or moved on the movement of the float, or the valve may be modified, so that the fluid does not pass in the length of the valve itself. Thus the valve may be of any suitable form.

We claim:

1. In a boiler feed water regulator comprising a balance piston controlling the boiler feed check valve and a float operated valve controlling the movements of the balance piston, the provision of a rotatable float operated valve which is balanced laterally and longitudinally by fluid pressure, substantially as described.

2. In a boiler feed water regulator comprising a balance piston controlling the boiler feed check valve and a float operated valve controlling the movements of the balance piston, the provision of a rotatable float operated valve of a hollow cylindrical form, inlet and outlet ports provided in the said valve, a spindle concentrically disposed with reference to said valve, said spindle having movement imparted to it on the operation of the float, and means detachably connecting the spindle and valve for communicating movement from the spindle to the valve, substantially as described.

3. In a boiler feed water regulator comprising a balance piston controlling the boiler feed check valve and a float operated valve controlling the movements of the balance piston, the provision of a rotatable float operated valve, pairs of diametrically disposed ports of equal area in said valve communicating with a central cavity therein, said pairs of ports serving respectively as inlet and outlet ports, substantially as described.

4. In a boiler feed water regulator comprising a balance piston controlling the boiler feed check valve and a float operated valve controlling the movements of the balance piston, the provision of a rotatable float operated valve, a valve chamber containing said valve, a clearance space at each end of said valve chamber, and means to permit equalization of pressure on the valve within said clearance spaces, substantially as described.

5. In a boiler feed water regulator comprising a balance piston controlling the boiler feed check valve and a float operated valve controlling the movements of the balance piston, the provision of a rotatable float operated valve of cylindrical form, said valve being laterally and longitudinally balanced, and means for carrying the said valve comprising a conical plug within which the valve is concentrically mounted, the said conical plug being adapted to be rotated according to the determined water level, substantially as described.

6. In a boiler feed water regulator comprising a balance piston controlling the boiler feed check valve and a float operated valve controlling the movements of the balance piston, the provision of a rotatable float operated valve, a plug within which said valve is mounted, said plug being adjustable according to the water level, a float operated spindle concentrically disposed with the said valve, and means for connecting said spindle with the said valve, substantially as described.

7. In a boiler feed water regulator comprising a balance piston controlling the boiler feed check valve and a float operated valve controlling the movements of the balance piston, the provision of a cylindrical float operated valve, pairs of inlet and outlet ports in said valve, a plug within which said valve is disposed, and means for effecting a fluid tight joint between the valve and the plug in positions between the respective pairs of inlet and outlet ports, substantially as described.

8. In a boiler feed water regulator comprising a balance piston controlling the boiler feed check valve and a float operated valve controlling the movements of the balance piston, the provision of a rotatable float operated valve, pairs of inlet and outlet ports in said valve, a plug within which said valve is disposed, ports within said plug adapted to register with the outlet ports in the valve, and means for rotating the plug in order to vary the angle of valve cut off, substantially as described.

9. In a boiler feed water regulator comprising a balance piston controlling the boiler feed check valve and a float operated valve controlling the movements of the balance piston, the provision of a rotatable float operated valve, pairs of inlet and outlet ports in said valve, said valve being laterally and longitudinally balanced, a rotatably mounted plug within which said valve is disposed and means whereby variation of the operative water level does not affect the inlet of water to the valve nor the balancing of the valve, substantially as described.

10. In a boiler feed water regulator comprising a balance piston controlling the boiler feed check valve and a float operated valve controlling the movements of the balance piston, the provision of a rotatable float operated valve, pairs of inlet and outlet ports in said valve, a plug within which said valve is disposed, said plug being provided with outlet ports adapted for registration with the outlet ports of the valve, and means to permit free access of water to the inlet and outlet ports of the valve, substantially as described.

11. In a boiler feed water regulator comprising a balance piston controlling the boiler feed check valve and a float operated valve controlling the movements of the balance piston, the provision of a rotatable float operated valve balanced laterally and longitudinally by equalizing fluid pressure thereon, pairs of inlet and outlet ports in said valve, a plug within which said valve is disposed and a housing for the reception of the valve carrying plug, substantially as described.

12. In a boiler feed water regulator comprising a balance piston controlling the boiler feed check valve and a float operated valve controlling the movements of the balance piston, the provision of a rotatable float operated valve balanced laterally and longitudinally, pairs of inlet and outlet ports in said valve, a plug within which said valve is mounted, a housing within which said plug is disposed, a float containing casing with which the said housing is connected, a float carrying spindle within said float containing casing, and bearings for the said float spindle, one of said bearings being provided upon the plug housing, substantially as described.

13. In a boiler feed water regulator comprising a balance piston controlling the boiler feed check valve and a float operated valve controlling the balance piston, a rotary float operated valve, a spindle for the float imparting movement to the rotary valve, and means for longitudinally and laterally balancing both the valve and spindle.

14. In a boiler feed water regulator comprising a balance piston controlling the boiler feed check valve and a float operated valve controlling the balance piston, a rotary float operated valve, a spindle for the float imparting movement to the rotary valve and means comprising fluid pressure for longitudinally and laterally balancing both the valve and spindle.

15. In a boiler feed water regulator comprising a balance piston controlling the boiler feed check valve and a float operated valve controlling the balance piston, a rotary float operated valve, a spindle for the valve slidably connected to the valve to rotate the same, and means for longitudinally and laterally balancing the valve and spindle.

WILLIAM HENRY LOVETT.
ALBERT EDWIN DOBBS.